United States Patent [19]
Shoji

[11] Patent Number: 5,926,471
[45] Date of Patent: Jul. 20, 1999

[54] CDMA COMMUNICATION METHOD, CDMA TRANSMITTER AND CMDA RECEIVER

[75] Inventor: Takashi Shoji, Tokyo, Japan

[73] Assignee: NEC Corporation, Japan

[21] Appl. No.: 08/878,629

[22] Filed: Jun. 19, 1997

[30] Foreign Application Priority Data

Jun. 21, 1996 [JP] Japan .................................. 8-181199

[51] Int. Cl.⁶ .................................................. H04B 7/216
[52] U.S. Cl. ........................ 370/342; 370/350; 370/515; 375/200; 375/367
[58] Field of Search ................................. 370/342, 328, 370/332, 350, 355, 513, 515, 201, 286; 375/200, 208, 254, 365, 366, 367

[56] References Cited

U.S. PATENT DOCUMENTS

| | | | |
|---|---|---|---|
| 5,359,624 | 10/1994 | Lee | 370/342 |
| 5,619,491 | 4/1997 | Panzer | 370/342 |
| 5,673,260 | 9/1997 | Umeda | 370/342 |
| 5,748,623 | 5/1998 | Sawahashi | 370/342 |

FOREIGN PATENT DOCUMENTS 61-174841  8/1986  Japan .
2-132934   5/1990  Japan .

*Primary Examiner*—Ajit Patel
*Assistant Examiner*—Ricardo M. Pizarro
*Attorney, Agent, or Firm*—Ostrolenk, Faber, Gerb & Soffen, LLP

[57] ABSTRACT

For a CDMA communication system using an interference canceller, a communication system which enables the interference canceller to easily confirm pulling-in of its own signal is disclosed. Input transmission signals are stored through a serial-parallel converter 101 in storage circuits 301 and 302, each of which holds one frame of transmission signals for I and Q axes. An area for holding one cycle of spreading codes for the I and Q axes output from a spreading code generator 105 is formed in the rearmost part of each of the transmission data strings of the storage circuits 301 and 302. One frame of transmission signals prepared by a pilot inserting device 102 and frame synchronizing signals are transferred to a transmitted circuit 103 in sequence. These signals are then transmitted as data for the I and Q axes by symbol rate clocks. The data for the I and Q axes are multiplied by chip rate spreading codes output from a spreading code generator 105, a spreading code for the I axis and a spreading code for the Q axis in a spreader 104 and then output as spread spectrum signals.

6 Claims, 4 Drawing Sheets

CDMA COMMUNICATION METHOD, CDMA TRANSMITTER AND CMDA RECEIVER

BACKGROUND OF THE INVENTION

The present invention relates to the transmitting and receiving system and device of a communication system, which uses a code division multiple access (referred to as CDMA, hereinafter) communication system for transmitting an information signal after modulating the same by a signal having a speed several tens to several hundreds times as fast as its speed.

As a prior art for such a system, for example, a miniaturized device was disclosed in JP-A-132934/1990. This device is constructed in such a manner that in an identification signal transmitter for transmitting an identification signal containing a frame synchronizing signal and an error detecting code and data containing a frame synchronizing signal and an error detecting code, an inverter and a switch are provided for making frame synchronizing signals completely different from each other between identification signal transmission and data transmission.

This conventional identification signal transmitter will now be described by referring to FIG. 4. As shown in FIG. 4, the conventional identification signal transmitter includes an identification code storage circuit 401, a frame synchronizing signal generating circuit 402, an inverter 403, first and second switches 404 and 405, an error detection encoder 406 and a sequential circuit 407.

Next, the operation of the conventional identification signal transmitter will be described.

The identification code storage circuit 401 outputs an identification signal to the second switch 405, described later. The frame synchronizing signal generating circuit 402 directly outputs a frame synchronizing signal to the first switch 404. Alternatively, the circuit 402 outputs a frame synchronizing signal to the first switch 404 after inverting its polarity by the inverter 403. During transmission of an identification signal, this first switch 404 selects a non-inverted frame synchronizing signal which has not been passed through the inverter 403. During transmission of data, however, the switch 404 selects and outputs an inverted frame synchronizing signal which has been passed through the inverter 403.

The second switch 405 operated associatively with the first switch 404 switches identification signals from the identification code storage circuit 401 with data and then outputs the results to the error detection encoder 406. The signals having been passed through the error detection encoder 406 are output from the sequential circuit 407 in sequence according to a transmission signal format.

With the above-described conventional identification signal transmitter, since frame synchronizing signals are made completely different from each other between transmission of an identification signal and transmission of data by using the inverter 403, a communication system which can prevent misunderstanding between data and an identification signal in a receiving side is provided.

Referring to JP-A-174841/1986, there is disclosed an art for capturing synchronization of a spread spectrum without using any delay lock loops in a receiver side. According to this application, in order to simplify synchronizing timing in the receiver side, the spread spectrum system of a frequency hopping coherent detection system is constructed in such a manner that a dual scrambler for a hopping pattern and a signal itself is used, and the same bit is used for a signal for capturing the hopping pattern and a frame synchronizing signal for scrambling of a signal frame unit. In other words, a transmission signal is scrambled by the serial pseudo noise (referred to as PN, hereinafter) signal of a 10th-order group. But since first 16 bits of the frame are synchronizing signals, these signals are not subjected to scrambling and become particular synchronizing patterns. For a carrier having been subjected to frequency hopping, a PN signal of 7th-order signal was used for the frequency hopping. But in a time portion equivalent to the first 16 bits of the above-noted frame, no frequency hopping is performed. In the receiver side, detection of a receiving timing is performed by detecting such particular synchronizing patterns which are known beforehand by a matched filter.

With this conventional spread spectrum system, there exists a capturing pattern not spread in the hopping pattern, this pattern is not subjected to scrambling for a signal and a synchronizing pattern is also provided for processing of a signal by a frame unit. Accordingly, a communication system is realized, whereby frequency hopping and frame synchronization are simultaneously performed only by simple pattern matching in the receiver side.

Conventionally, in the case of the communication system which communicates information by using the spread spectrum, especially if a single user type interference canceller is used, the interference canceller estimates the distortion of a signal in a transmission line only by a code allocated to the canceller without knowing spreading codes allocated to the other users. In this case, it may happen that the interference canceller makes a mistake in the estimation of a transmission line and misunderstands other user's signals for its own.

In order to avoid this problem and easily determine whether a signal pulled in by the interference canceller is a signal for its own use or not, in the above-noted communication system, a transmitted and received signal must contain information specific to each user.

In connection with this problem, the prior art disclosed in JP-A-132934/1990 is disadvantageous in that the generation of frame synchronizing signals increases the size of a circuit. This is specifically because it is difficult to provide new identification signals for quite a number of users by using only; an inverter and a switch. Even if a device for each user is individually provided and all kinds of identification signals are provided, a great increase inevitably occurs in the size of the circuit.

The prior art disclosed in JP-A-174841/1986 is also disadvantageous in that it is impossible to multiplex a plurality of users. This is because the original purpose of the spread spectrum communication system is to multiplex plural bits of information on the same time and on the same frequency by spreading information signals with codes. In the case of this prior art, the use of a common timing capturing signal for scrambling of an information signal and hopping of a communication frequency is effective for a reduction in the size of the circuit. However, since the signal for timing capture is not subjected to scrambling or frequency hopping, this portion cannot be multiplexed when a plurality of users are to be multiplexed.

SUMMARY OF THE INVENTION

A purpose of the present invention is to provide a CDMA transmitting and receiving system which is capable of estimating the distortion of a signal in a transmission line and demodulating this signal only by codes allocated to the system without knowing spreading codes allocated to an interference canceller type user, containing information specific to each user in a transmitted and received signal, so as to easily determine whether a signal pulled in by an interference canceller is a signal for its own or not when the interference canceller of a single user type is used, and a CDMA transmitting and receiving circuit which is capable of limiting increases in the sizes of a device and a circuit to minimum levels in a communication system for communicating information by using a spread spectrum.

The purpose of the present invention is achieved by a CDMA communication system, which is characterized in that in a spread spectrum communication system for transmitting an information signal after spreading the same with a spreading signal, a symbol string for a frame synchronizing signal inserted into a transmission signal so as to extract a symbol transmission timing from a de-spread signal is created from the group of codes used as spreading codes by utilizing the characteristic of the CDMA communication system in which spreading signals different among users are used.

The CDMA transmitter of the present invention includes spreading code generating means for generating spreading codes, switching means for dividing the bit string of the spreading codes into a bit string for an I axis and a bit string for a Q axis, serial-parallel means for converting a transmission signal string into a signal string for the I axis and a signal string for the Q axis, inserting means for inserting the bit string obtained by division for the I axis into the signal string for the I axis and the bit string obtained likewise for the Q axis into the signal string for the Q axis, both as pilot signals for frame synchronization, sequential transmitting means for transmitting signals in which the pilot signal are inserted in exact timing with the transmission of symbols and spreading means for spreading the signals transmitted from the sequential transmitting means by using the spreading codes.

The CDMA receiver of the present invention includes an interference canceller operated to cancel the distortion of a received signal in a transmission line, spreading code generating means for generating codes for de-spreading, detecting means for performing synchronization detection by using received pilot signals, frame synchronization detecting means for detecting the breaks of frames by using the received pilot signals and user identifying means for identifying received signals.

The present invention employs a configuration wherein the string of symbols for frame synchronizing signals inserted into a transmission signal so as to extract a symbol transmission timing from a signal having been de-spread is created from a group of codes used as spreading signals by utilizing the characteristic of the CDMA communication system which uses spreading codes different among users. According to the present invention, signals to be transmitted and received in which frame synchronizing signals are different among users can be easily produced and determination can be made as to whether the interference canceller has received a signal for its own or not without knowing spreading codes allocated to the other users.

Furthermore, since a symbol string for frame synchronizing signals is subjected to spreading, no problems will occur during multiplexing of users.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

The preferred embodiment of the present invention will be described below with reference to the accompanying drawings.

Figure 1:
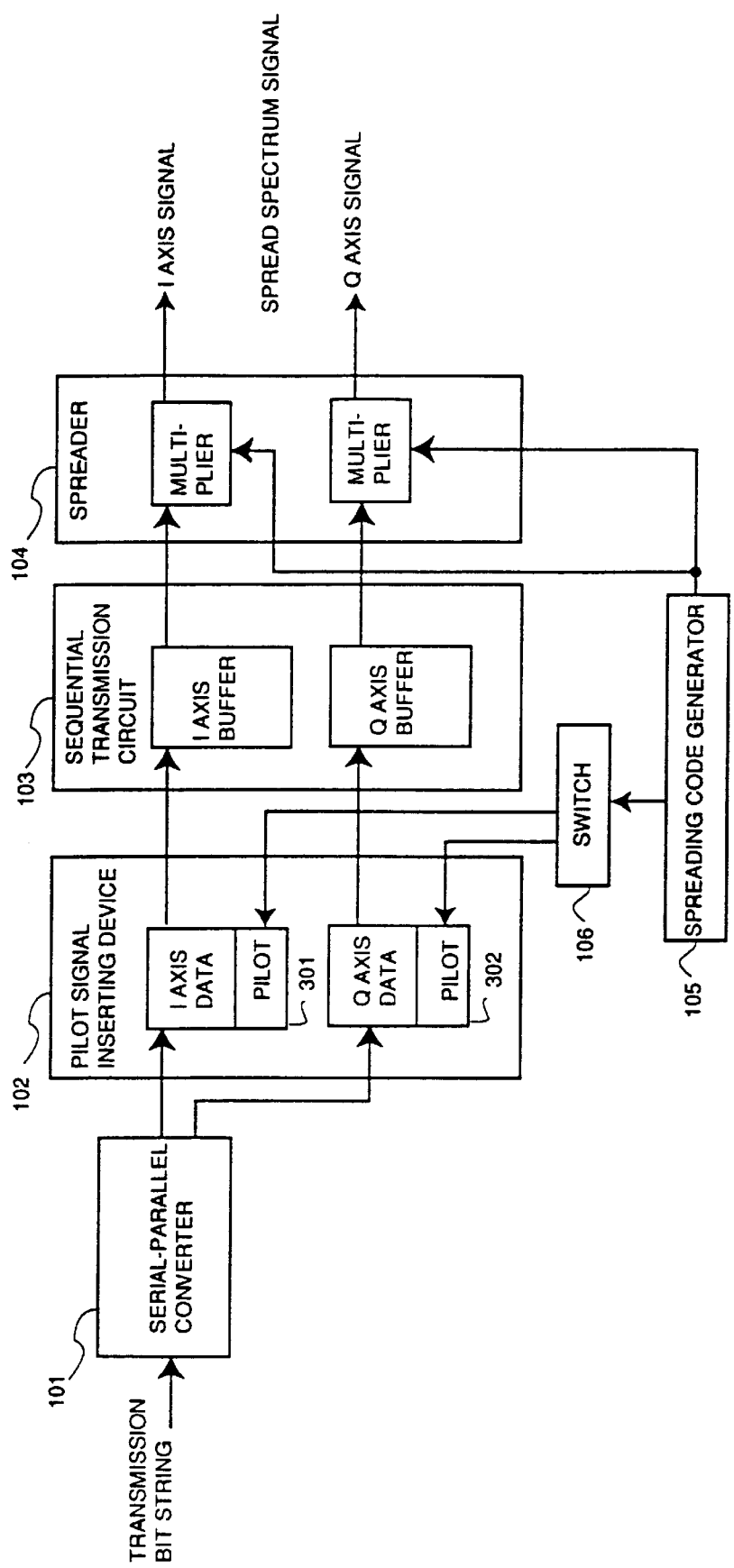
FIG. 1 is a view showing circuitry of a transmitter of an embodiment of the present invention.
Figure 2:
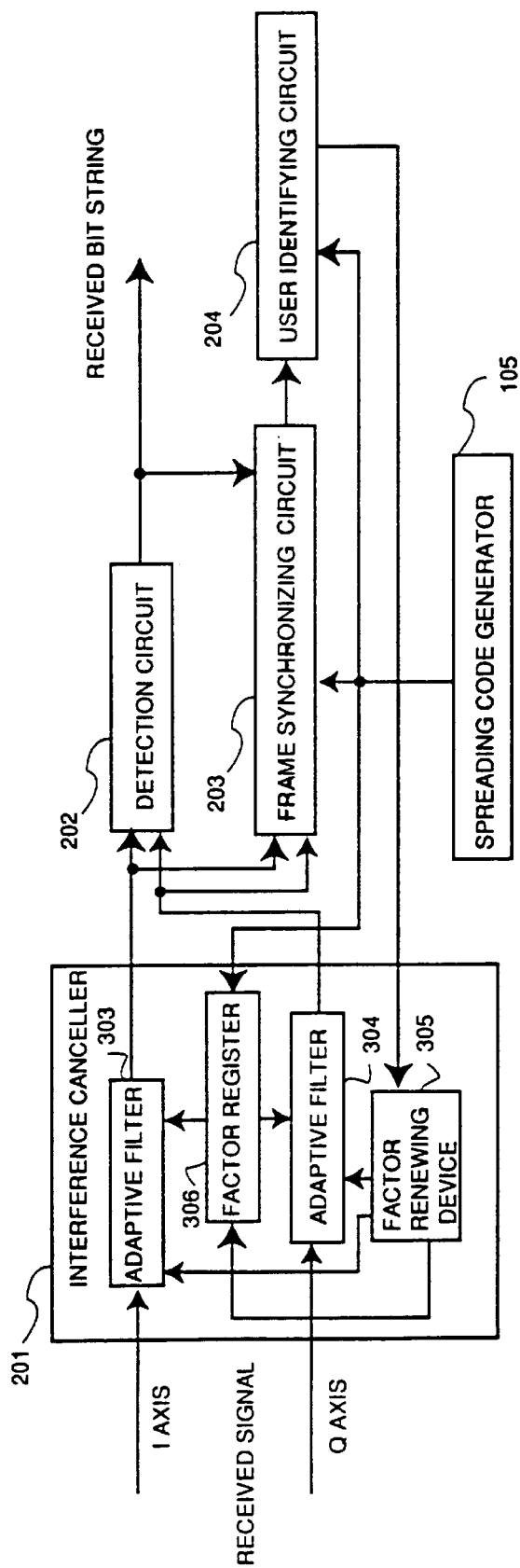
FIG. 2 is a view showing circuitry of a receiver of the embodiment of the present invention.
Figure 3:
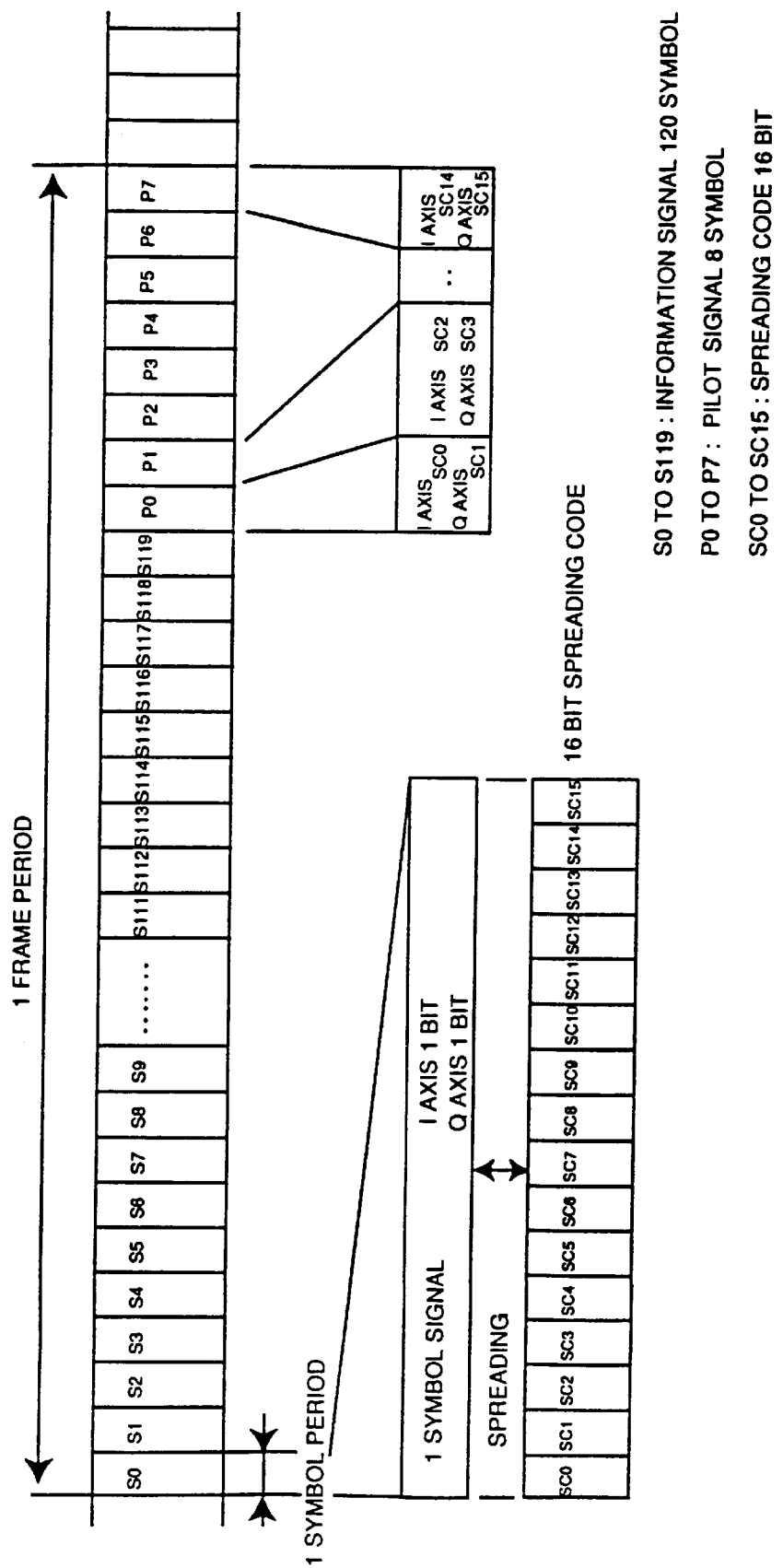
FIG. 3 is a view showing a signal format for illustration of signal transmission and reception in a CDMA transmitting and receiving system of the embodiment of the present invention.
Figure 4:
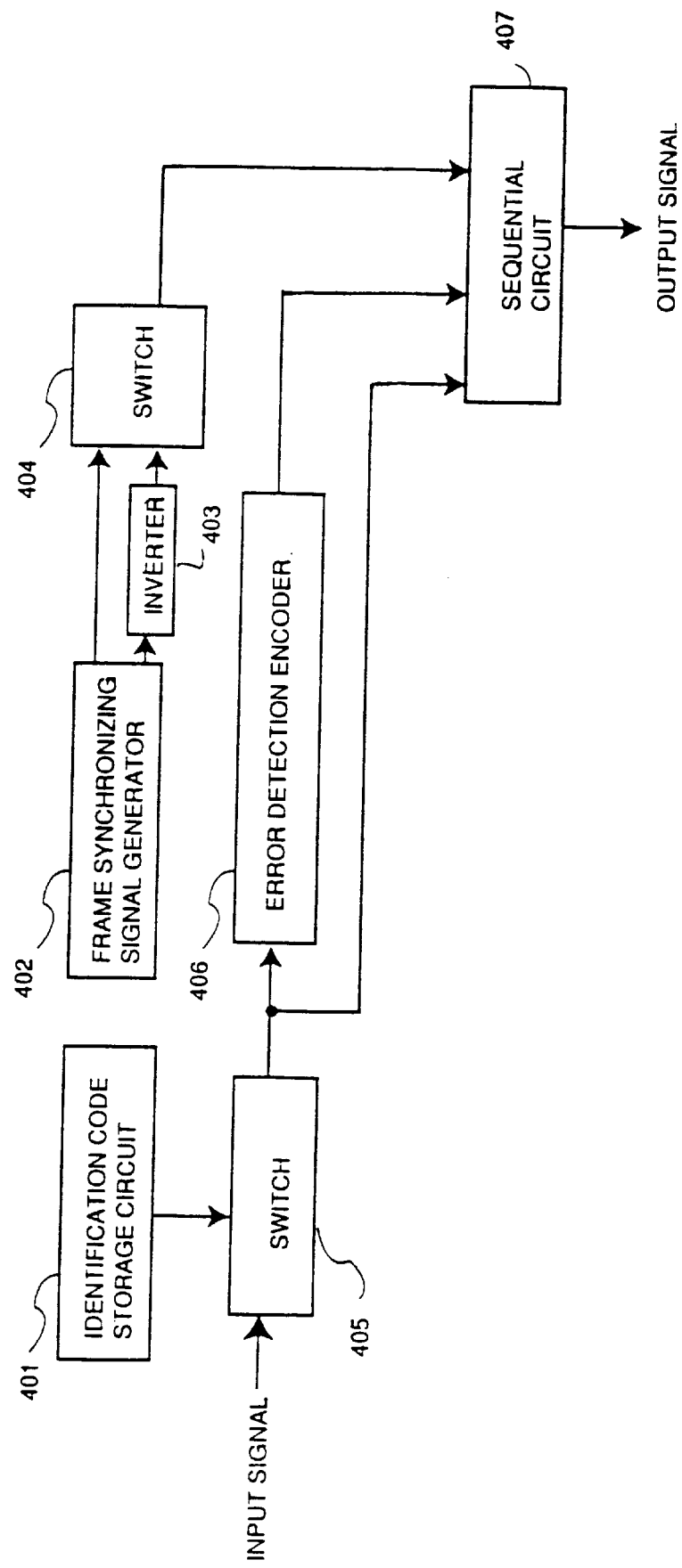
FIG. 4 is a view showing a circuitry of a conventional identification signal device as disclosed in JP-A-132934/1990.

FIG. 1 is a view showing the circuitry of a transmitter in the CDMA transmitting and receiving system of an embodiment of the present invention. FIG. 2 is a view showing the circuitry of a receiver in the CDMA transmitting and receiving system of the embodiment of the present invention. FIG. 3 is a view showing one example of a signal format for the transmitted and received signal of the CDMA transmitting and receiving system of the embodiment of the present invention.

Referring to FIG. 1, according to the embodiment of the present invention, the CDMA transmitter includes a serial-parallel converter 101 for converting a transmission signal string into signal strings for I and Q axes, a storage circuit (pilot signal inserting device) 102 for inserting pilot signals for frame synchronization in the respective signals, a sequential transmission circuit 103 for transmitting a transmission symbol according to a transmission symbol timing, a spreader 104 composed of multipliers for performing spreading and a switch 106 for dividing the bit string of spreading codes into bit strings for I and Q axes and converting the codes into symbols.

Referring to FIG. 2, according to the embodiment of the present invention, the CDMA receiver is operated to cancel the distortion of a received signal in a transmission line. This receiver includes an interference canceller 201, a spreading code generator 105 for generating codes for de-spreading, a detection circuit 202 for detecting synchronization by using a received pilot signal, a frame synchronization circuit 203 for detecting the break of a frame by using a received pilot signal and a user identifying circuit 204 for identifying a received signal.

Referring to FIG. 3, there is shown a symbol unit format for a signal to be transmitted and received. One frame of transmitted and received signals is equivalent to 128 symbols and 8 of these symbols are used as pilot signals (P0 to L7) for frame synchronization. In the drawing, 1 symbol is subjected to spreading by spreading codes of 16 bits.

Next, the operations of the CDMA transmitter and the CDMA receiver of the embodiment of the present invention will be described with reference to FIGS. 1, 2 and 3.

Referring first to FIG. 1, input transmission signals are alternately divided each by 1 bit by the serial-parallel converter 101 and then these divided signals are input to the storage circuit 102 as signals for the I and Q axes.

The storage circuit 102 includes first and second storage circuits 301 and 302 for respectively holding one frame of transmission signals for the I axis and one frame of transmission signals for the Q axis. In each of the rearmost part of the transmission data strings of the first and second storage circuits 301 and 302, an area for holding one cycle of spreading codes output from the spreading code generator 105 as frame synchronizing signals is provided.

The frame synchronizing signals are inserted into proper areas by dividing SC15 of the output 16 bits SC0 of the spreading code generator 105 into SC0, SC2, SC4, ..., SC14 for the I axis and SC1, SC3, SC5, ..., SC15 for the Q axis each by 1 bit with the switch 106.

One frame of transmission signals and frame synchronizing signals prepared in the pilot signal inserting device 102 are transferred to the sequential transmission circuit (I axis buffer and Q axis buffer) 103 in the next stage and transmitted as data for the I and Q axes which form symbol signals by the clock of a symbol rate. The data for the I and Q axes are then respectively multiplied by spreading codes SC0 to SC15 of 16 bit chip rate output from the spreading code generator 105 in the spreader 104 and then output as spread spectrum signals.

FIG. 3 illustrates the input and output of this spreader 104.

Referring to FIG. 2, the input transmission signals for the I and Q axes are converted from spread spectrum signals into symbol rates by the interference canceller 201. The interference canceller 201 includes a factor register 306 for holding one cycle of spreading codes generated by the spreading code generator 105, adaptive filters 303 and 304 for setting the spreading codes to initial values and a factor renewing device 305.

The interference canceller 201 de-spreads received signals into symbol data while rewriting factors by the factor renewing device 305 in sequence so as to reduce to a minimum a difference between the original symbol point of the composite bit data string of the received signals and a received symbol point.

One of the symbol data obtained by de-spreading is input to the frame synchronization circuit 203 and the other is input to the detection circuit 202. In the frame synchronization circuit 203, frame synchronization is detected based on a correlation with received symbols by using one cycle of spreading codes output from the spreading code generator 105 as frame synchronizing symbols.

The detected frame synchronizing signals are input to the detection circuit 202. In the detection circuit 202, the received symbols are converted into bit data by synchronization detection according to the timing of the frame synchronizing signals. One of the demodulated bit data is input to the factor renewing device 305 of the interference canceller 201 and the other is input to the user identifying circuit 204.

In the factor renewing device 305, a difference between a symbol point reproduced from the decoded bit data and the received symbol point is calculated and the factors of the adaptive filters are renewed in sequence so as to reduce this difference to a minimum.

In the user identifying circuit 204, a frame synchronizing bit portion is extracted from the received bit data string and pattern matching is performed with the bit string of one cycle of spreading codes generated by the spreading code generator 105.

During this time, if the number of produced bit errors exceeds a preset permissible bit number, the user identifying circuit 204 determines that the interference canceller 201 has received a signal other than a signal from the proper user and then returns the factors of the adaptive filters 303 and 304 to the initial values held by the factor register 306.

As apparent from the foregoing, the present invention has the following effects.

First, for CDMA transmission and receiving which use the interference canceller of a single user type, a communication system which is capable of identifying the signal of a user pulled in by the interference canceller without reducing communication speed is provided.

Such a communication system is provided because in the CDMA transmitting and receiving system of the present invention, a bit string for a frame synchronizing signal inserted into a transmission signal so as to extract a symbol transmission timing from a de-spread signal is created from the group of codes used as spreading codes by utilizing the characteristic of the CDMA communication system which uses spreading codes different among users. Accordingly, it is not necessary to contain new information specific to each user in a transmission signal and a user can be identified while keeping the original information communication speed.

Second, a CDMA transmitting and receiving device can be provided which uses the interference canceller of a single user type and is also capable of minimizing increases in the sizes of a device and a circuit.

Such a transmitting and receiving device is provided because it is not necessary to provide a new identification signal generating circuit for each user because the string of spreading codes originally allocated to respective users is directly used as the string of frame synchronizing signals for the respective users.

The entire disclosure of Japanese Patent Application No. 8-181199 filed on Jun. 21, 1996, including specification, claims, drawings and summary are incorporated herein by reference in its entirety.

What is claimed is:

1. A CDMA communication method using spreading codes which differ among users, said method comprising:

a step for generating spreading codes for a specified user;

a step for dividing a bit string of said spreading codes for said user into a string for an I axis and a string for a Q axis;

a step for converting a transmission signal string for said user into a signal string for said I axis and a signal string for said Q axis;

a step for inserting said bit string for said I axis obtained by division into said signal string for said I axis and for inserting said bit string for said Q axis obtained by division into said signal string for said Q axis both as bit strings for frame synchronization;

a step for transmitting signals of said I and Q axes into which said bit strings for frame synchronization are inserted in exact timing with symbol transmission;

a step for spreading and transmitting said signals of said I and Q axes transmitted in exact timing with said symbol transmission by using said spreading codes for said user;

a step for generating a received bit data string by receiving a transmission signal and de-spreading said signals of said I and Q axes;

a step for extracting a frame synchronizing bit portion from said received bit data string; and a step for identifying coincidence of said received transmission signal with a transmission signal addressed to said user by performing pattern matching between said extracted frame synchronizing bit portion and said spreading code string for said user, wherein said step for division of said bit string of said spreading codes is a step for dividing a bit string of one cycle of spreading codes, and which is performed bit by bit alternating between said I axis string and said Q axis string.

2. A CDMA communication method using spreading codes which differ among users, said method comprising:

a step for generating spreading codes for a specified user;

a step for dividing a bit string of said spreading codes for said user into a string for an I axis and a string for a Q axis;

a step for converting a transmission signal string for said user into a signal string for said I axis and a signal string for said Q axis;

a step for inserting said bit string for said I axis obtained by division into said signal string for said I axis and for inserting said bit string for said Q axis obtained by division into said signal string for said Q axis both as bit strings for frame synchronization;

a step for transmitting signals of said I and Q axes into which said bit strings for frame synchronization are inserted in exact timing with symbol transmission;

a step for spreading and transmitting said signals of said I and Q axes transmitted in exact timing with said symbol transmission by using said spreading codes for said user;

a step for generating a received bit data string by receiving a transmission signal and de-spreading said signals of said I and Q axes;

a step for extracting a frame synchronizing bit portion from said received bit data string; and a step for identifying coincidence of said received transmission signal with a transmission signal addressed to said user by performing pattern matching between said extracted frame synchronizing bit portion and said spreading code string for said user, wherein said step for insertion of said bit string for frame synchronization includes inserting a divided bit string into a rearmost part of said transmission signal string.

3. A CDMA communication method using spreading codes which differ among users, said method comprising:

a step for generating spreading codes for a specified user;

a step for dividing a bit string of said spreading codes for said user into a string for an I axis and a string for a Q axis;

a step for converting a transmission signal string for said user into a signal string for said I axis and a signal string for said Q axis;

a step for inserting said bit string for said I axis obtained by division into said signal string for said I axis and for inserting said bit string for said Q axis obtained by division into said signal string for said Q axis both as bit strings for frame synchronization;

a step for transmitting signals of said I and Q axes into which said bit strings for frame synchronization are inserted in exact timing with symbol transmission;

a step for spreading and transmitting said signals of said I and Q axes transmitted in exact timing with said symbol transmission by using said spreading codes for said user;

a step for generating a received bit data string by receiving a transmission signal and de-spreading said signals of said I and Q axes;

a step for extracting a frame synchronizing bit portion from said received bit data string; and a step for identifying coincidence of said received transmission signal with a transmission signal addressed to said user by performing pattern matching between said extracted frame synchronizing bit portion and said spreading code string for said user, wherein said step for identification further includes a step for determining reception of a signal other than said signal for said user, and then de-spreading another transmission signal when a result of said pattern matching shows that bit errors have been provided which exceed a preset permissible number.

4. A CDMA transmitter for transmitting an information signal after spreading said information signal with a spreading signal, said transmitter comprising:

spreading code generating means for generating spreading codes;

switching means for dividing a bit string of said spreading codes into a bit string for an I axis and a bit string for a Q axis;

serial-parallel means for converting a transmission signal string into a signal string for said I axis and a signal string for said Q axis;

inserting means for inserting said bit string obtained by division for said I axis in said signal string for said I axis and said bit string obtained by division for said Q axis in said signal string for said Q axis both as pilot signals for frame synchronization;

sequential transmitting means for transmitting signals in which said pilot signals are inserted in exact timing with symbol transmission; and spreading means for spreading said signals transmitted from said sequential transmitting means by using said spreading codes, wherein said inserting means includes means for generating one frame of transmission signals by holding one cycle of bit strings for said I axis output from said switching means and adding said bit strings to a rearmost part of said signal string for said I axis to which said bit string for said I axis is input, and includes means for generating one frame of transmission signals by holding one cycle of bit strings for said Q axis output from said switching means and adding said bit strings to a rearmost part of said signal string for said Q axis to which said bit string for said Q axis is input.

5. A CDMA transmitter for transmitting an information signal after spreading said information signal with a spreading signal, said transmitter comprising:

spreading code generating means for generating spreading codes;

switching means for dividing a bit string of said spreading codes into a bit string for an I axis and a bit string for a Q axis;

serial-parallel means for converting a transmission signal string into a signal string for said I axis and a signal string for said Q axis;

inserting means for inserting said bit string obtained by division for said I axis in said signal string for said I axis and said bit string obtained by division for said Q axis in said signal string for said Q axis both as pilot signals for frame synchronization;

sequential transmitting means for transmitting signals in which said pilot signals are inserted in exact timing with symbol transmission; and spreading means for spreading said signals transmitted from said sequential transmitting means by using said spreading codes, wherein said spreading means includes a first multiplier for multiplying spreading codes with said transmission signals for said I axis and a second multiplier for multiplying spreading codes with said transmission signals for said Q axis.

6. A CDMA receiver for de-spreading and demodulating received spread signals, said receiver comprising:

an interference canceler operated so as to cancel distortion in said received signals;

spreading code generating means for generating codes for de-spreading;

detecting means for detecting synchronization by using received pilot signals;

frame synchronization detecting means for detecting frame breaks by using said received pilot signals; and user identifying means for identifying said received signals wherein said user identifying means includes means for extracting a frame synchronizing bit portion from a received bit data string, means for performing pattern matching between said extracted frame synchronizing bit portion and one cycle of bit strings of spreading codes generated by said spreading code generating means, and means for performing an initial setting for said interference canceler by determining if a signal other than a signal of its own user has been received by said interference canceler when bit errors have been produced which exceed a preset permissible number.

* * * * *